Patented Feb. 7, 1939

2,146,356

UNITED STATES PATENT OFFICE 2,146,356

DIALKYLAMINOPHOSPHOROUS FLUORIDES AND A PROCESS FOR PREPARING THE SAME

Gerhard Schrader and Otto Bayer, Leverkusen-I. G. Werk, Germany, assignors to Winthrop Chemical Company, Inc., New York, N. Y., a corporation of New York No Drawing. Application June 30, 1936, Serial No. 88,263. In Germany July 2, 1935

11 Claims. (Cl. 260—563)

This invention relates to dialkylaminophosphorous fluorides and to a process for preparing the same.

In accordance with the present invention dialkylaminophosphorous fluorides the phosphorus atom of which is linked to the group

wherein $R_1$ and $R_2$ stand for alkyl radicals, and to at least one fluorine atom, can be obtained by reacting a dialkylaminophosphorous compound the phosphorus atom of which is linked to the group

and to at least one halogen atom which is capable of being substituted by a fluorine atom, with compounds containing exchangeable fluorine atoms.

$R_1$ and $R_2$ may stand, for instance, for a methyl, ethyl, propyl, hexyl and dodecyl radical. $R_1$ and $R_2$ may also denote alkyl radicals which are substituted, for instance, by a halogen atom, amino, hydroxyl, alkoxy or aryl groups. $R_1$ and $R_2$ may stand either for the same or for different alkyl radicals.

Compounds of the said kind are, for instance, dimethylaminophosphorous chloride, diethylaminophosphorous chloride, dipropylaminophosphorous chloride, methylethylaminophosphorous chloride, di-(aminoethyl)-aminophosphorous chloride, di-(aminohexyl)-aminophosphorous chloride, di-(hydroxyethyl)-aminophosphorous chloride, hydroxypropyl-ethyl-aminophosphorous chloride, di-(methoxyethyl)-aminophosphorous chloride, methoxyethyl-methyl-aminophosphorous chloride, dibenzylaminophosphorous chloride, benzylmethoxyethyl-aminophosphorous chloride, or the corresponding bromides (see Annalen der Chemie, volume 326, pages 193 and 215) or iodides.

We wish it to be understood that in the description and in the appended claims the term "alkyl" is intended to comprise the unsubstituted as well as the substituted alkyl radicals.

Those dialkylaminophosphorous compounds which contain two halogen atoms which are capable of being substituted by fluorine atoms and which are linked at the phosphorus atom have proved to be particularly advantageous for the present process since they may easily be prepared.

In the starting dialkylaminophosphorous compounds other substituents particularly metalloids of the sixth group of the periodic system of elements, for instance, oxygen or sulfur, may be linked at the phosphorus atom besides the dialkylamino group and the replaceable halogen atoms. Compounds of the last-mentioned kind, such as diethylaminophosphorous oxychloride, diethylaminophosphorous sulfochloride, ethylmethyl-aminophosphorous oxychloride, dimethylaminophosphorous sulfochloride, dimethoxy-ethylaminophosphorous oxychloride, benzyl-hydroxyethylaminophosphorous oxychloride, di-(chloroethyl)aminophosphorous oxychloride, bromopropyl-ethyl-aminophosphorous sulfochloride are most easily available for instance by reacting the corresponding secondary aliphatic amines with phosphorous trichloride, phosphorous oxychloride or phosphorous sulfochloride and are, therefore, most suitable for practically carrying out the present process.

As compounds containing exchangeable fluorine atoms there come particularly into consideration soluble and especially watersoluble fluorides, such as hydrofluoric acid and metal fluorides, for instance, zinc fluoride, potassium fluoride, sodium fluoride and ammonium fluoride. The soluble alkali metal fluorides and ammonium fluoride have proved to be particularly advantageous for the present process. But also the fluorides of metalloids, such as silicon tetrafluoride, titanium tetrafluoride and arsenic fluoride may be employed.

The reaction described above is preferably performed in the presence of a solvent for the compound containing exchangeable fluorine atoms, such as for instance, in the presence of water, methyl or ethyl alcohol. It is especially noticeable that the reaction may also be performed in the presence of water, since it is a well known fact that certain compounds containing substituents which may be substituted by fluorine atoms, such as for instance, dimethylaminophosphorous oxychloride, are totally saponified after a short boiling with water.

The new dialkylaminophosphorous fluorides are water-white mobile liquids which display an ethereal (iodoform or chloroform-like) odor and which do not etch glass. They are soluble in benzine, benzene, carbontetrachloride and alcohol and are relatively stable to boiling water.

The dialkylaminophosphorous fluorides have proved to be especially advantageous for the purpose of combating parasites particularly of insects. The lower members of the dialkylaminophosphorous fluorides in which $R_1$ and $R_2$ stand for alkyl radicals containing from 1-3 carbon atoms have proved to be most suitable, since they may be easily vaporized or nebulized.

The dialkylaminophosphorous fluorides may be employed in the most varied manner. They may be used in the gaseous phase either alone or with the addition of other inert gases or gases being effective for combating vermin, for instance, carbon dioxide, carbon monoxide, ethylene oxide or hydrocyanic acid. Also warning or irritating substances, such as chloroformic acid ester may be added to the dialkylaminophosphorous fluorides to be gasified.

Furthermore, they may be sprayed or nebulized in the form of their solutions, for instance, in water or low boiling solvents, such as carbon tetrachloride, acetone, benzene, benzine or also in admixture with unsaturated solvents, as are obtained for instance, in the petroleum fractionation. To solutions or dispersions of the said kind likewise other media for combating vermin, for instance, nicotin may be added. The solutions of the dialkylaminophosphorous fluorides may also be absorbed by suitable substances, such as for instance, paper or porous substances and may then be employed.

The dialkylaminophosphorous fluorides may also be used in solid or paste-like form alone or in admixture with inert substances and/or other solid or liquid media for combating vermin. Talc or chalc may, for instance, serve as inert stretching agent. The dialkylaminophosphorous fluorides may be marketed in the form of powder or in the form of tablets.

The dialkylaminophosphorous fluorides may serve for combating the most varied kinds of vermin. They have proved to be especially suitable for combating *Calandra granaria*, *Tenebrio Molitor* and others, bedbugs, cockroaches, lice, flies, gnats, all kinds of moths, fur-beetle, carpet-beetle and its larva, ants, plant lice, phylloxera, shield-lice and others. The dialkylaminophosphorous fluorides may also be employed for exterminating rats, mice and the like.

The following examples illustrate the invention without limiting it thereto, the parts being by weight:

Example 1

95 parts of diethylaminophosphorous oxychloride (boiling point 99° C.) are heated on the waterbath for 1½ hours with 100 parts of potassium fluoride in 120 parts of water while vigorously stirring. The potassium chloride which is thereby separated is redissolved by adding water. The oily reaction product is extracted with ether. After the ether having been distilled off the oily residue is distilled in vacuo. A water-white liquid having a iodoform-like odor is distilled at 45 to 46° C. under a pressure of 13 mm. which liquid proves to be the diethylaminophosphorous oxyfluoride.

Example 2

103 parts of diethylaminophosphorous sulfochloride (boiling point 103° C.) are heated to boiling for 12 hours with 100 parts of potassium fluoride in 120 parts of water. The oily reaction product is extracted from the aqueous suspension with ether after the evaporation of which the residue is distilled off in vacuo. The diethylaminophosphorous sulfofluoride obtained distills at 50–51° C. under a pressure of 12 mm. It is a colorless oil of a chloroform-like odour.

Example 3

50 parts of diethylaminophosphorous dichloride (Annaler, vol. 326, p. 153) (boiling point 72° C.) are added drop by drop to 50 parts of finely pulverized anhydrous antimony trifluoride. The gaseous diethylaminophosphorous difluoride which may be condensed to a colorless liquid with solid carbonic acid separates with strong self-heating.

Instead of the antimony trifluoride also arsenic trifluoride (boiling point 63° C.) may be employed.

Example 4

95 parts of diethylaminophosphorous oxychloride are added to 100 parts of anhydrous hydrofluoric acid in an iron autoclave. 1 part of antimony trifluoride is added as catalyst. The whole mass is stirred for two days at room temperature. By the evolution of hydrochloric acid a pressure of 8–10 at. is gradually formed. After the reaction is finished the reaction product is subjected to fractional distillation. The portion which is distilled between 45 and 46° C. under a pressure of 13 mm. is at first washed with water and afterwards with a dilute solution of sodium bicarbonate, whereupon it is dried with sodium sulfate and once more subjected to fractional distillation. In this manner 30 to 40 parts of diethylaminophosphorous oxyfluoride (boiling point 45–46° C.) are obtained.

We claim:

1. Dialkylaminophosphorous fluorides the phosphorus atom of which is linked to the group

wherein $R_1$ and $R_2$ stand for alkyl radicals, and to at least one fluorine atom, which compounds are water-white mobile liquids displaying an ethereal odor, which do not etch glass, which are soluble in benzine, benzene, carbon tetrachloride and alcohol and which are relatively stable to boiling water.

2. Dialkylaminophosphorous fluorides the phosphorus atom of which is linked to the group

wherein $R_1$ and $R_2$ stand for alkyl radicals containing from 1 to 3 carbon atoms, and to two fluorine atoms, which compounds are water white mobile liquids displaying an ethereal odor, which do not etch glass, which are soluble in benzine, benzene, carbon tetrachloride and alcohol and which are relatively stable to boiling water.

3. Dialkylaminophosphorous fluorides of the general formula

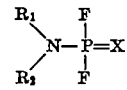

wherein $R_1$ and $R_2$ stand for alkyl radicals and X for a member of the group consisting of oxygen and sulfur, which compounds are water-white liquids displaying an ethereal odor, which do not etch glass, which are soluble in benzine, benzene, carbon tetrachloride and alcohol and which are relatively stable to boiling water.

4. Dialkylaminophosphorous fluorides of the general formula

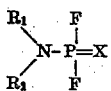

wherein $R_1$ and $R_2$ stand for alkyl radicals containing from 1 to 3 carbon atoms and X for a member of the group consisting of sulfur and oxygen, which compounds are water-white mobile liquids displaying an ethereal odor, which do not etch glass, which are soluble in benzine, benzene, carbon tetrachloride and alcohol and which are relatively stable to boiling water.

5. The process for the manufacture of dialkylaminophosphorous fluorides which comprises reacting a dialkylaminophosphorous compound the phosphorus atom of which is linked to the group

wherein $R_1$ and $R_2$ stand for alkyl radicals, and to at least one halogen atom selected from the group consisting of chlorine and bromine with fluoride selected from the group consisting of fluorides of metalloids and watersoluble metal fluorides.

6. The process for the manufacture of dialkylaminophosphorous fluorides which comprises reacting a dialkylaminophosphorous compound the phosphorus atom of which is linked to the group

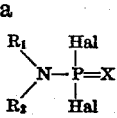

wherein $R_1$ and $R_2$ stand for alkyl radicals, and to two halogen atoms selected from the group consisting of chlorine and bromine with fluorides selected from the group consisting of fluorides of metalloids and watersoluble metal fluorides in the presence of a solvent.

7. The process for the manufacture of dialkylaminophosphorous fluorides which comprises reacting a dialkylaminophosphorous compound of the general formula $$\begin{array}{c} R_1 \quad Hal \\ \diagdown \quad | \\ N-P=X \\ \diagup \quad | \\ R_2 \quad Hal \end{array}$$

wherein $R_1$ and $R_2$ stand for alkyl radicals, X for a member of the group consisting of oxygen and sulfur, and Hal for halogen atoms selected from the group consisting of chlorine and bromine with fluorides selected from the group consisting of fluorides of metalloids and watersoluble metal fluorides in the presence of a solvent and while heating.

8. The process for the manufacture of dialkylaminophosphorous fluorides which comprises reacting a dialkylaminophosphorous compound the phosphorus atom of which is linked to the group

wherein $R_1$ and $R_2$ stand for alkyl radicals, and to at least one halogen atom selected from the group consisting of chlorine and bromine with a watersoluble metal fluoride in the presence of a solvent.

9. The process for the manufacture of dialkylaminophosphorous fluorides which comprises reacting a dialkylaminophosphorous compound the phosphorus atom of which is linked to the group $$\begin{array}{c} R_1 \\ \diagdown \\ N- \\ \diagup \\ R_2 \end{array}$$

wherein $R_1$ and $R_2$ stand for alkyl radicals containing from 1 to 3 carbon atoms, and to two halogen atoms, selected from the group consisting of chlorine and bromine with a watersoluble metal fluoride in the presence of water.

10. The process for the manufacture of dialkylaminophosphorous fluorides which comprises reacting a dialkylaminophosphorous compound the phosphorus atom of which is linked to the group

wherein $R_1$ and $R_2$ stand for alkyl radicals containing from 1 to 3 carbon atoms, and to two halogen atoms selected from the group consisting of chlorine and bromine with a watersoluble alkali metal fluoride in the presence of water.

11. The process for the manufacture of dialkylaminophosphorous fluorides which comprises reacting a dialkylaminophosphorous compound of the general formula $$\begin{array}{c} R_1 \quad Hal \\ \diagdown \quad | \\ N-P=X \\ \diagup \quad | \\ R_2 \quad Hal \end{array}$$

wherein $R_1$ and $R_2$ stand for alkyl radical containing from 1 to 3 carbon atoms and X for a member of the group consisting of oxygen and sulfur and Hal for halogen atoms of the group consisting of chlorine and bromine, with a watersoluble alkali metal fluoride, in the presence of water while heating to boiling.

GERHARD SCHRADER.
OTTO BAYER.